(12) United States Patent
Nakanishi et al.

(10) Patent No.: US 9,409,569 B2
(45) Date of Patent: Aug. 9, 2016

(54) CONTROL DEVICE FOR VEHICLE DRIVE DEVICE

(71) Applicant: TOYOTA JIDOSHA KABUSHIKI KAISHA, Aichi (JP)

(72) Inventors: Naoki Nakanishi, Susono (JP); Susumu Kojima, Susono (JP); Shintaro Matsutani, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/427,209

(22) PCT Filed: Sep. 18, 2012

(86) PCT No.: PCT/JP2012/073850
§ 371 (c)(1),
(2) Date: Mar. 10, 2015

(87) PCT Pub. No.: WO2014/045342
PCT Pub. Date: Mar. 27, 2014

(65) Prior Publication Data
US 2015/0239468 A1    Aug. 27, 2015

(51) Int. Cl.
| | |
|---|---|
| *B60W 20/00* | (2016.01) |
| *B60K 6/48* | (2007.10) |
| *B60W 10/02* | (2006.01) |
| *B60W 10/06* | (2006.01) |
| *B60W 30/20* | (2006.01) |
| *F02N 11/08* | (2006.01) |

(52) U.S. Cl.
CPC .................. *B60W 20/40* (2013.01); *B60K 6/48* (2013.01); *B60W 10/02* (2013.01); *B60W 10/06* (2013.01); *B60W 30/20* (2013.01); *F02N 11/0848* (2013.01); *F02N 11/0851* (2013.01); *B60W 2030/203* (2013.01); *B60W 2030/206* (2013.01); *B60W 2510/0661* (2013.01); *Y02T 10/6221* (2013.01); *Y10S 903/93* (2013.01); *Y10T 477/71* (2015.01)

(58) Field of Classification Search
CPC ............................. B60W 20/40; B60W 10/02
See application file for complete search history.

(56) References Cited

U.S. PATENT DOCUMENTS

| | | | |
|---|---|---|---|
| 2004/0149247 | A1 | 8/2004 | Kataoka et al. |
| 2006/0196460 | A1 | 9/2006 | Ohtsu et al. |
| 2009/0037085 | A1 | 2/2009 | Kojima |
| 2009/0105038 | A1 | 4/2009 | Weiss et al. |

FOREIGN PATENT DOCUMENTS

| | | |
|---|---|---|
| EP | 1840369 A1 | 10/2007 |
| JP | 2002-004985 A | 1/2002 |

(Continued)

*Primary Examiner* — Derek D Knight
(74) *Attorney, Agent, or Firm* — Oliff PLC (57) ABSTRACT

A control device of a vehicle drive device includes a direct injection engine, an electric motor, and a clutch selectively coupling the direct injection engine to a power transmission path from the electric motor to drive wheels, the control device slips the clutch and starts the direct injection engine by an ignition start with fuel injected into a cylinder of the direct injection engine and ignited from a start of rotation of the direct injection engine if the direct injection engine is started during a running mode using only the electric motor as a drive source, the control device weakens an engagement force of the clutch if a shaft torque of the direct injection engine goes through a first negative torque extreme value after initiation of a start of the direct injection engine and becomes zero from a negative torque as compared to before becoming the zero.

4 Claims, 8 Drawing Sheets

(56) References Cited

FOREIGN PATENT DOCUMENTS

| | | |
|---|---|---|
| JP | 2004-239111 A | 8/2004 |
| JP | 2005-307870 A | 11/2005 |
| JP | 2006-242089 A | 9/2006 |
| JP | 2006-299997 A | 11/2006 |
| JP | 2007-270803 A | 10/2007 |
| JP | 2009-114942 A | 5/2009 |
| JP | 2009-527411 A | 7/2009 |
| JP | 2011-016390 A | 1/2011 |

CONTROL DEVICE FOR VEHICLE DRIVE DEVICE

TECHNICAL FIELD

The present invention relates to an improvement in control of starting an engine in a hybrid vehicle.

BACKGROUND ART

A control device of a vehicle drive device including an engine, an electric motor, and an engine clutch selectively coupling the engine to a power transmission path from the electric motor to drive wheels has hitherto been known. For example, this corresponds to a control device of a vehicle drive device described in Patent Document 1. The control device of a vehicle drive device of Patent Document 1 provides engine start control of temporarily releasing the engine clutch after allowing the engine clutch to start slipping before complete engagement when the engine is started during motor running using only the power of the electric motor for running. Specifically, in the engine start control, first, the engine clutch is allowed to slip so as to increase the engine rotation speed and, when the engine rotation speed reaches a predetermined rotation speed determined as enabling the self-sustaining rotation of the engine, the engine clutch is released. The control device of a vehicle drive device further increases the engine rotation speed with the engine clutch released, starts an engagement operation of the engine clutch after the engine rotation speed becomes higher than the electric motor rotation speed, and completely engages the engine clutch when the engine rotation speed is synchronized with the electric motor speed.

PRIOR ART DOCUMENT

Patent Documents

Patent Document 1: Japanese Laid-Open Patent Publication No. 2011-016390
Patent Document 2: Japanese Laid-Open Patent Publication No. 2009-527411

SUMMARY OF THE INVENTION

Problem to be Solved by the Invention

A direct injection engine with fuel directly injected into a cylinder is generally known as an engine for a vehicle along with a conventional engine that is an engine with fuel injected into an intake pipe. Although the engine of Patent Document 1 is considered as the conventional engine, it is conceivable that the direct injection engine is used instead of the conventional engine. In such a case, to achieve early completion of the engine start, it is effective to slip the engine clutch and start the direct injection engine by an ignition start with fuel injected into a cylinder of the direct injection engine and ignited from the start of rotation of the direct injection engine if the direct injection engine is started during a running mode for performing the motor running.

However, the ignition start results in a sharp rise and a large variation of an engine rotation speed Ne and, therefore, the predetermined rotation speed determined as enabling the self-sustaining rotation of the direct injection engine is set higher as compared to the conventional engine so as to secure the startability of the engine. Therefore, even if it is instructed to release the engine clutch based on the engine rotation speed Ne reaching the predetermined rotation speed in the engine start control, the time point of completion of release of the engine clutch is delayed relative to the time point at which the engine rotation speed Ne exceeds an electric motor rotation speed Nmg, and the engine clutch may have a torque capacity for a while after the time point at which the engine rotation speed Ne exceeds the electric motor rotation speed Nmg. In such a case, to suppress a vehicle shock, a torque compensation from the electric motor is necessary for a clutch transmission torque transmitted by the engine clutch from the engine toward the electric motor (drive wheels). Particularly, an electric motor compensation torque for canceling the clutch transmission torque must be reversed between before and after a time point (a reverse time point) at which the engine rotation speed Ne exceeds the electric motor rotation speed Nmg; however, if the timing of reversing the electric motor compensation torque deviates from the reverse time point, a vehicle shock occurs and deteriorates the drivability. As described above, in the engine start control of the direct injection engine, determining the timing of release of the engine clutch based on the engine rotation speed Ne has a problem that a vehicle shock deteriorating the drivability is highly likely to occur. The problem as described above is unknown. The electric motor compensation torque is a portion of the output torque of the electric motor and makes up, together with a running torque, the output torque of the electric motor (simply referred to as an electric motor torque).

The present invention was conceived in view of the situations and it is therefore an object of the present invention to provide a control device of a vehicle drive device capable of suppressing a shock due to an engine start in a vehicle having a direct injection engine and an electric motor when the engine is started during a running mode using only the electric motor as a drive source.

Means for Solving the Problem

To achieve the object, the first aspect of the invention provides a control device of a vehicle drive device including (a) a direct injection engine, an electric motor, and a clutch selectively coupling the direct injection engine to a power transmission path from the electric motor to drive wheels, (b) the control device slipping the clutch and starting the direct injection engine by an ignition start with fuel injected into a cylinder of the direct injection engine and ignited from a start of rotation of the direct injection engine if the direct injection engine is started during a running mode using only the electric motor as a drive source, (c) the control device weakening an engagement force of the clutch if a shaft torque of the direct injection engine goes through a first negative torque extreme value after initiation of a start of the direct injection engine and becomes zero from a negative torque as compared to before becoming the zero.

Effects of the Invention

At the engine start, when the cylinder in an intake stroke and closest to a compression stroke at the start of rotation of the direct injection engine enters the compression stroke and the cylinder is within the compression stroke, an engine stall is most likely to occur. In other words, when the cylinder is within the compression stroke, a first largest compression torque (the first negative torque extreme value) is generated. When the cylinder passes through the compression stroke and enters the subsequent expansion stroke, the direct injection engine generates a torque in the positive direction in the expansion stroke and, therefore, the next cylinder entering the compression stroke subsequently to the cylinder is facilitated to compress intake air and easily increases the engine rotation speed. Therefore, when the engine is started during the running mode using only the electric motor as a drive source, the control device as described in the first aspect of the invention can weaken the engagement force of the clutch at the timing earlier than the determination based on the engine rotation speed while ensuring the certainty of the engine start, in accordance with the torque variation based on the mechanism of the direct injection engine. As a result, the torque capacity of the clutch can sufficiently be reduced before the time point at which the engine rotation speed exceeds the electric motor rotation speed at the engine start and, therefore, the shock due to the engine start can be suppressed. The shaft torque of the direct injection engine corresponds to a torque simply referred to as an engine torque, or specifically, a torque output from an output shaft (crankshaft) of the direct injection engine. Weakening the engagement force of the clutch is, in other words, to reduce the engagement force of the clutch.

The second aspect of the invention provides the control device of a vehicle drive device recited in the first aspect of the invention, wherein if an inertia torque of the direct injection engine is generated that is required for the shaft torque of the direct injection engine to go through the first negative torque extreme value and become zero from a negative torque after initiation of the start of the direct injection engine, the control device weakens the engagement force of the clutch as compared to before the required inertia torque is generated, even though the shaft torque of the direct injection engine is a negative torque. Consequently, the control device can weaken the engagement force of the clutch at the earlier timing while ensuring the certainty of the engine start, as compared to the first aspect of the invention. Therefore, the shock due to the engine start can more certainly be suppressed.

The third aspect of the invention provides the control device of a vehicle drive device recited in the first or second aspect of the invention, wherein if a crank angle rotated from a stop state of the direct injection engine reaches a predefined crank angle determination value after initiation of the start of the direct injection engine, the control device considers that the shaft torque of the direct injection engine goes through the first negative torque extreme value after initiation of the start of the direct injection engine and becomes zero from a negative torque. Consequently, the control device can easily determine the timing of weakening the engagement force of the clutch by detecting the crank angle of the direct injection engine.

The fourth aspect of the invention provides a control device of a vehicle drive device including (a) a direct injection engine, an electric motor, and a clutch selectively coupling the direct injection engine to a power transmission path from the electric motor to drive wheels, (b) the control device slipping the clutch and starting the direct injection engine by an ignition start with fuel injected into a cylinder of the direct injection engine and ignited from a start of rotation of the direct injection engine if the direct injection engine is started during a running mode using only the electric motor as a drive source, (c) the control device weakening an engagement force of the clutch before a piston position reaches an expansion stroke completion position from a compression top dead center after a compression stroke in a cylinder in which an intake valve is first switched from an opened state to a closed state after initiation of a start of the direct injection engine among multiple cylinders included in the direct injection engine as compared to before the piston position reaches the compression top dead center. Consequently, the control device can start weakening the engagement force of the clutch after the cylinder having the intake valve first switched from the opened state to the closed state certainly enters the expansion stroke and therefore can secure the more certain engine start.

Preferably, in the ignition start of the direct injection engine, fuel is first injected into the cylinder in which the piston position is in the expansion stroke among the multiple cylinders included in the direct injection engine and the fuel is ignited.

Preferably, the vehicle drive device includes a fluid transmission device including an input-side rotating element to which power from the direct injection engine and the electric motor is input, and an output-side rotating element outputting the power to the drive wheels.

Any one aspect of the invention of the first to third aspects of the invention and the fourth aspect of the invention may be implemented in a mutually combined manner by setting the order of priority, for example.

MODE FOR CARRYING OUT THE INVENTION

An example of the present invention will now be described in detail with reference to the drawings.

Example

Figure 1:
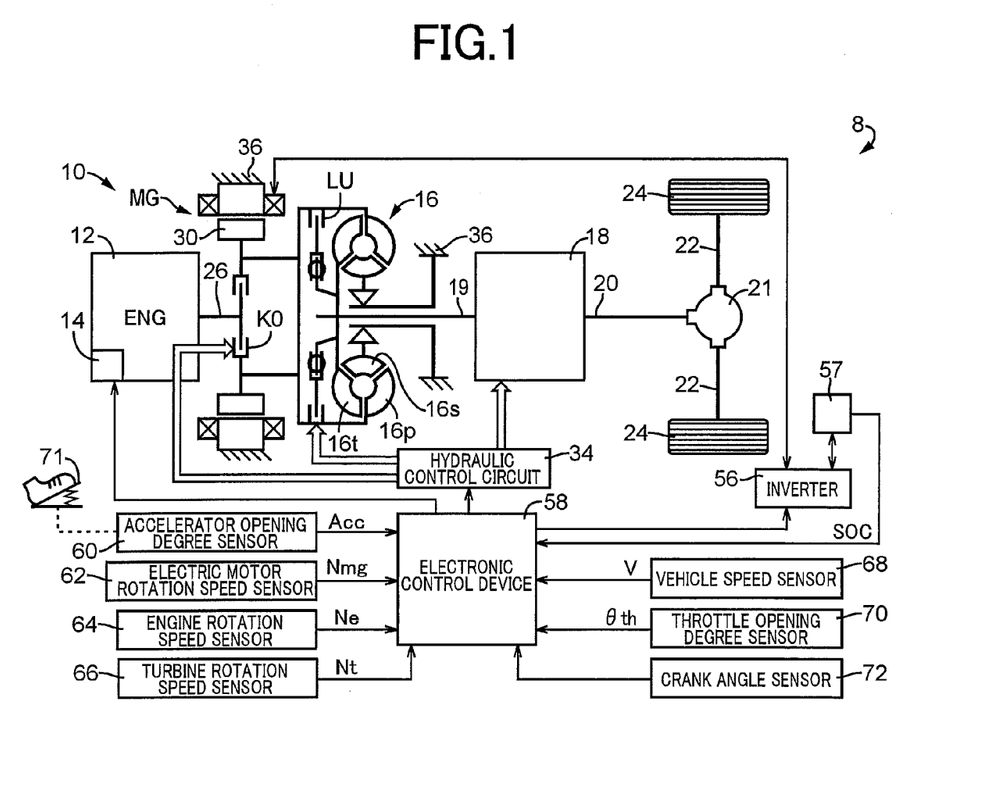
FIG. 1 is a conceptual diagram of a configuration of a drive system according to a hybrid vehicle that is an example of the present invention.

FIG. 1 is a conceptual diagram of a configuration of a drive system according to a hybrid vehicle 8 (hereinafter also simply referred to as a "vehicle 8") that is an example of the present invention. The hybrid vehicle 8 depicted in FIG. 1 includes a vehicle drive device 10 (hereinafter referred to as a "drive device 10"), a differential gear device 21, a pair of left and right axles 22, a pair of left and right drive wheels 24, a hydraulic control circuit 34, an inverter 56, and an electronic control device 58. The drive device 10 includes an engine 12 that may act as a drive source for running, an engine output control device 14 starting or stopping the engine 12 and providing engine output control such as throttle control, an electric motor MG that is an electric motor for running and may act as a drive source for running, an engine connecting/disconnecting clutch K0 corresponding to a clutch of the present invention, a torque converter 16, and an automatic transmission 18. As depicted in FIG. 1, the vehicle 8 is configured such that the power generated by one or both of the engine 12 and the electric motor MG is transmitted via each of the torque converter 16, the automatic transmission 18, the differential gear device 21, and the pair of the left and right axles 22 to the pair of the left and right drive wheels 24. Therefore, the vehicle 8 can select a motor running mode using only the electric motor MG as the drive source and an engine running mode using the engine 12 as the drive source in an alternative manner. In this example, the running of the vehicle in the motor running mode is referred to as motor running and the running of the vehicle in the engine running mode is referred to as engine running. Therefore, the motor running is the running of the vehicle using only the power of the electric motor MG for running and the engine running is the running of the vehicle using the power of the engine 12 for running. In the engine running, the electric motor MG may generate an assist torque depending on a running state. The motor running mode corresponds to a "running mode using only an electric motor as a drive source" in the present invention.

The electric motor MG is coupled to the drive wheels 24, is a three-phase synchronous electric motor, for example, and is a motor generator having a function of a motor (mover) generating the power and a function of a generator (electric generator) generating a reaction force. For example, the electric motor MG performs regenerative operation to generate a vehicle braking force. The electric motor MG is electrically connected via the inverter 56 to an electric storage device 57, and the electric motor MG and the electric storage device 57 are configured such that electric power can mutually be given and received. The electric storage device 57 is, for example, a battery (secondary battery) such as a lead storage battery or a capacitor.

A power transmission path between the engine 12 and the electric motor MG is disposed with the engine connecting/disconnecting clutch K0 made up of a generally known wet multi-plate type hydraulic friction engagement device and the engine connecting/disconnecting clutch K0 is operated by an oil pressure supplied from the hydraulic control circuit 34 and acts as a power connecting/disconnecting device which selectively couples the engine 12 to the power transmission path from the electric motor MG to the drive wheels 24. Specifically, an engine output shaft 26 (e.g., crankshaft) acting as an output member of the engine 12 is relatively non-rotatably coupled to a rotor 30 of the electric motor MG when the engine connecting/disconnecting clutch K0 is engaged and, is disconnected from the rotor 30 of the electric motor MG when the engine connecting/disconnecting clutch K0 is released. In short, the engine output shaft 26 is selectively coupled via the engine connecting/disconnecting clutch K0 to the rotor 30 of the electric motor MG. Therefore, the engine connecting/disconnecting clutch K0 is completely engaged in the engine running mode and is released in the motor running mode. The rotor 30 of the electric motor MG is relatively non-rotatably coupled to a pump impeller 16p that is an input member of the torque converter 16.

The automatic transmission 18 makes up a portion of the power transmission path between the torque converter 16 and the drive wheels 24 and transmits the power of the engine 12 or the electric motor MG to the drive wheels 24. The automatic transmission 18 is a stepped automatic transmission performing a clutch-to-clutch shift by changing gripped engagement elements in accordance with a preset relationship (shift diagram) based on a vehicle speed V and an accelerator opening degree Acc, for example. In other words, the automatic transmission 18 is an automatic transmission mechanism having any of predefined multiple shift stages (gear ratios) achieved in an alternative manner and includes a plurality of planetary gear devices and a plurality of clutches or brakes actuated by the oil pressure from the hydraulic control circuit 34 so as to perform the shift. The gear ratio of the automatic transmission 18 is calculated from the equation "gear ratio=transmission input rotation speed Natin/transmission output rotation speed Natout".

The torque converter 16 is a fluid transmission device interposed between the electric motor MG and the automatic transmission 18. The torque converter 16 includes the pump impeller 16p acting as an input-side rotating element to which the power of the engine 12 and the electric motor MG is input, a turbine impeller 16t acting as an output-side rotating element outputting the power to the automatic transmission 18, and a stator impeller 16s. The torque converter 16 transmits the power input to the pump impeller 16p via fluid (operating oil) to the turbine impeller 16t. The stator impeller 16s is coupled via a one-way clutch to a transmission case 36 that is a non-rotating member. The torque converter 16 includes a lock-up clutch LU between the pump impeller 16p and the turbine impeller 16t, selectively directly coupling the pump impeller 16p and the turbine impeller 16t to each other. The lock-up clutch LU is controlled by the oil pressure from the hydraulic control circuit 34.

Figure 2:
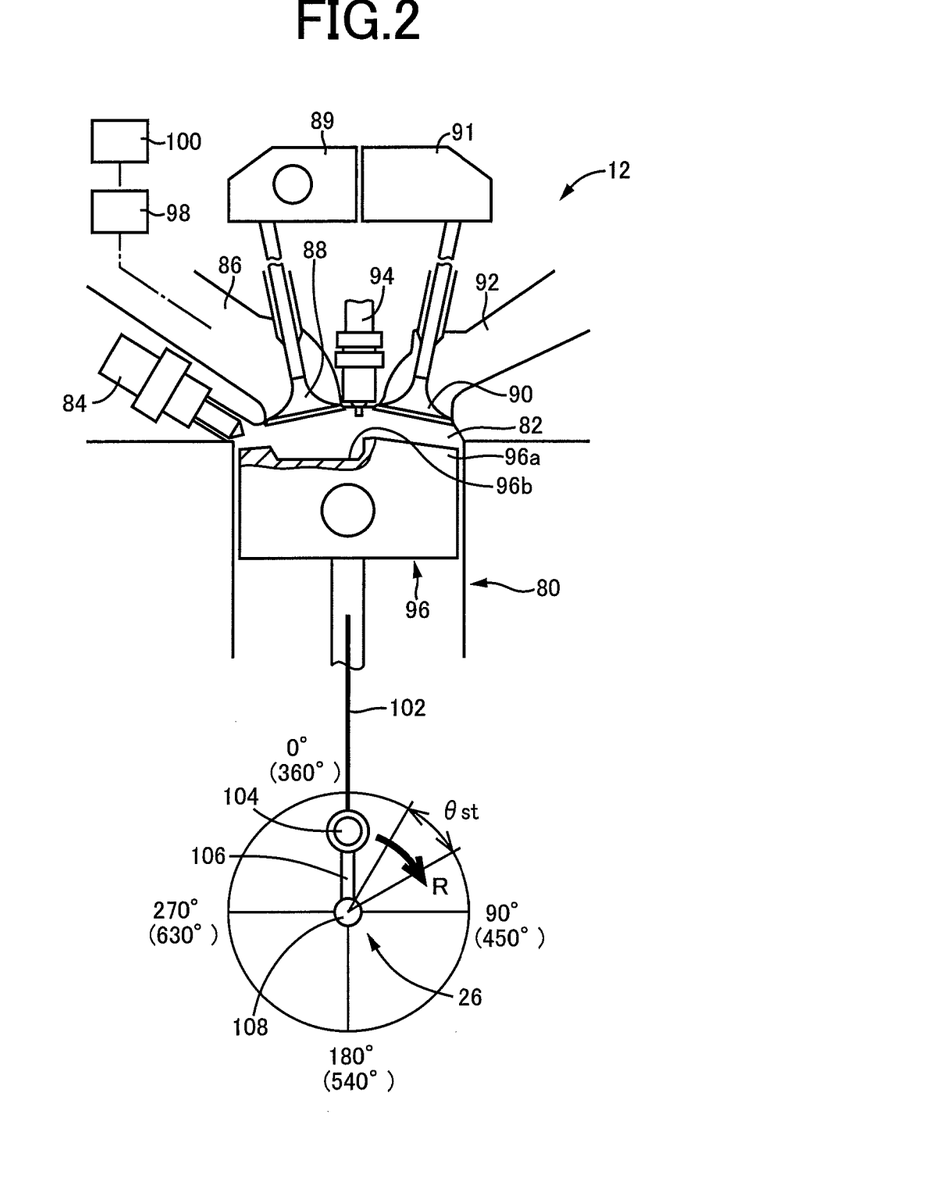
FIG. 2 is a cross-sectional diagram illustrating a combustion chamber of a direct injection engine and surroundings thereof included in the hybrid vehicle depicted in FIG. 1.

The engine 12 is a V-type eight-cylinder four-cycle direct injection type gasoline engine in this example and, as specifically depicted in FIG. 2, gasoline is directly injected in a high-pressure particulate state by a fuel injection device 84 into a combustion chamber 82 formed in a cylinder 80. The engine 12 allows air to flow from an intake passage 86 via an intake valve 88 into the combustion chamber 82 and allows an exhaust gas to be discharged from the inside of the combustion chamber 82 via an exhaust valve 90 to an exhaust passage 92 and, when ignition is caused by an ignition device 94 at predetermined timing, air-fuel mixture in the combustion chamber 82 is exploded and combusted to push down a piston 96 to the lower side. The intake valve 88 is reciprocated by an intake valve drive device 89 made up of a cam mechanism included in the engine 12 in synchronization with the rotation of a crankshaft 26 and thereby caused to perform an opening/closing operation. The exhaust valve 90 is reciprocated by an exhaust valve drive device 91 made up of the cam mechanism included in the engine 12 in synchronization with the rotation of the crankshaft 26 and thereby caused to perform an opening/closing operation. The intake passage 86 is connected via a surge tank 98 to an electronic throttle valve 100 acting as an intake air amount adjustment valve so as to control an amount of intake air flowing from the intake passage 86 into the combustion chamber 82, i.e., engine output, in accordance with an opening degree θth of the electronic throttle valve 100 (throttle valve opening degree θth). As depicted in FIG. 2, the piston 96 includes a piston top portion 96a defined as an end portion toward the combustion chamber 82 and forming a portion of the combustion chamber 82, and the piston top portion 96a includes a concave portion 96b, i.e., a cavity, opened toward the combustion chamber 82. The piston 96 is axially slidably fitted into the cylinder 80 and is relatively rotatably coupled via a connecting rod 102 to a crank pin 104 of the engine output shaft (crankshaft) 26, and the crankshaft 26 is rotationally driven as indicated by an arrow R in accordance with linear reciprocating movement of the piston 96. The crankshaft 26 is rotatably supported by a bearing in a journal portion 108 and integrally includes a crank arm 106 connecting the journal portion 108 and the crank pin 104. A shape such as a depth of the concave portion 96b disposed in the piston 96 is defined such that the fuel injected from the fuel injection device 84 during normal drive of the engine 12 is reflected in the concave portion 96b and forms an easily-ignited rich air-fuel mixture with the fuel moderately dispersed around the ignition device 94 so as to achieve a good explosion. During normal drive of the engine 12, the fuel is injected in a compression stroke of each of the cylinders 80.

The engine 12 as described above performs four strokes, i.e., an intake stroke, a compression stroke, an expansion (explosion) stroke, and an exhaust stroke, per two rotations (720 degrees) of the crankshaft 26 for one cylinder and this is repeated to allow the crankshaft 26 to continuously rotate. The pistons 96 of the eight cylinders 80 are configured to have the respective crank angles shifted by 90 degrees from each other and, in other words, the positions of the crank pins 104 of the crankshafts 26 are projected in directions shifted by 90 degrees from each other and, each time the crankshaft 27 rotates by 90 degrees, the eight cylinders 80 are exploded and combusted in a preset ignition order, thereby continuously generating a rotation torque. Since the engine 12 is a direct injection engine, the engine can be started by an ignition start with fuel injected and ignited in the cylinder 80 from the start of rotation of the engine 12. Specifically, the ignition start is an engine start method in which, when the crankshaft 26 rotates by a predetermined angle from a compression top dead center (compression TDC) after a compression stroke and the piston 96 is stopped within a predetermined angle range θst in an expansion stroke with both the intake valve 88 and the exhaust valve 90 closed, gasoline is first injected by the fuel injection device 84 into the cylinder 80 (into the combustion chamber 82) in the expansion stroke and ignited by the ignition device 94, thereby exploding and combusting the air-fuel mixture in the cylinder 80 to raise the engine rotation speed Ne. Although this ignition start enables the engine start without cranking by the electric motor MG etc., the ignition start is also performed when the engine 12 is started during the motor running in this example and, in this case, a slip engagement (hereinafter simply referred to as a slip) for slipping the engine connecting/disconnecting clutch K0 is achieved for enhancing the startability of the engine 12, thereby assisting the rise of the engine rotation speed Ne with the electric motor torque Tmg. When the angle range θst is within a range of, for example, about 30 to 60 degrees in terms of a crank angle after the compression top dead center, relatively large rotation energy is acquired from the ignition start; however, the ignition start can be performed even at about 90 degrees of the angle range θst.

The intake valve drive device 89 also has a function of changing opening/closing timing etc., of the intake valve 88 as needed and acts as an intake valve opening/closing timing changing device changing the opening/closing timing of the intake valve 88, for example. If the engine is started by the ignition start, the intake valve drive device 89 is controlled, for example, such that the closing timing of the intake valve 88 is shifted in a delaying direction within an adjustable range as much as possible so as to reduce a rotation resistance at the start of rotation of the engine 12. Although various operating principles of the intake valve drive device 89 are generally known, the intake valve drive device 89 may be, for example, a cam mechanism operated in conjunction with the rotation of the crankshaft 26 such that any of multiple cams having shapes different from each other is selectively used through hydraulic control or electric control for the opening/closing operation of the intake valve 88, or may utilize the cam mechanism operated in conjunction with the rotation of the crankshaft 26 along with a mechanism correcting the operation of the cams of the cam mechanism through hydraulic control or electric control for the opening/closing operation of the intake valve 88.

Figure 3:
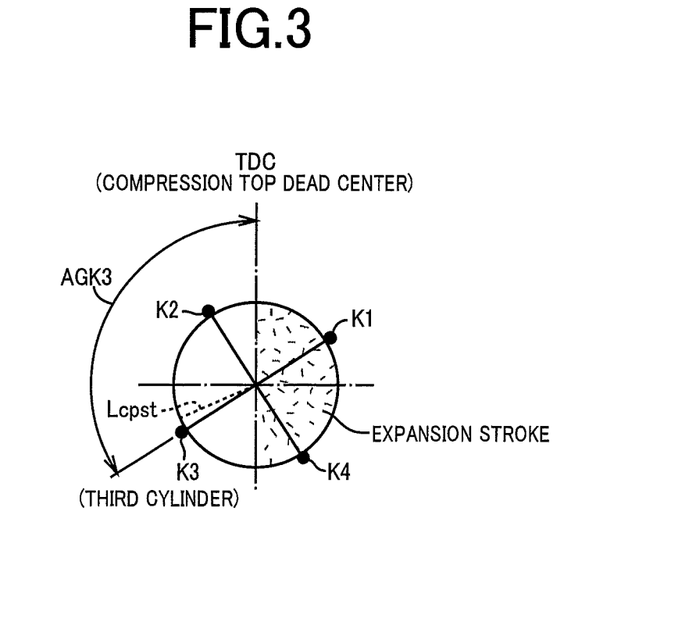
FIG. 3 is a cylinder phase diagram of a mutual relationship of phases of four cylinders involved with explosions during one rotation of a crankshaft in the engine depicted in FIG. 2 that is a V-type eight-cylinder engine.

FIG. 3 is a cylinder phase diagram of a mutual relationship of phases of four cylinders involved with explosions during one rotation of the crankshaft 26 in the engine 12 that is a V-type eight-cylinder engine. The numbers (K1 to K4) of the first to fourth cylinders K1 to K4 represent the order of phases (the order of piston positions) in the four strokes such as the compression stroke rather than the mechanical arrangement positions of the cylinders 80 of the engine 12. As depicted in FIG. 3, the first to fourth cylinders K1 to K4 rotate clockwise while maintaining a 90-degree relationship in phase from each other to sequentially perform the compression stroke in which intake air is compressed from the closing of the intake valve 88 until the compression TDC and the expansion stroke in which the piston 96 is pushed down by expansion of exploded gas from the compression TDC until the opening of the exhaust valve 90. The phase of the first cylinder K1 of FIG. 3 is in the expansion stroke; the phase of the second cylinder K2 is in the second half of the compression: stroke; the phase of the third cylinder K3 is immediately before the compression stroke; and the phase of the fourth cylinder K4 entering the compression stroke subsequently to the third cylinder K3 is also before the start of the compression stroke. In FIG. 3, a broken line Lcpst indicates a phase at which the compression stroke is started, i.e., a phase at which the intake valve 88 is switched from the opened state to the closed state.

For example, when the motor running mode is changed to the engine running mode in the hybrid vehicle 8, the engine rotation speed Ne is raised with the slip of the engine connecting/disconnecting clutch K0 to start the engine 12.

During vehicle deceleration when a foot brake is depressed or during inertia running when a vehicle braking operation and an acceleration operation by a driver are canceled, the electronic control device 58 provides electric motor regeneration control of supplying to the electric storage device 57 the regenerative energy acquired by braking the running vehicle 8 with the regenerative operation of the electric motor MG. Specifically, in the electric motor regeneration control, the engine connecting/disconnecting clutch K0 is released to interrupt the power transmission between the engine 12 and the drive wheels 24 while the engine 12 is stopped, and the electric motor MG is regeneratively operated by inertia energy of the vehicle 8. The inertia energy is regenerated as electric power and is stored from the electric motor MG to the electric storage device 57. While the electric motor regeneration control is provided, the lock-up clutch LU is engaged.

The vehicle 8 includes a control system as exemplarily illustrated in FIG. 1. The electronic control device 58 depicted in FIG. 1 has a function as a control device for controlling the drive device 10 and includes a so-called microcomputer. As depicted in FIG. 1, the electronic control device 58 is supplied with various input signals detected by sensors disposed in the hybrid vehicle 8. For example, the electronic control device 58 receives input of a signal indicative of the accelerator opening degree Acc that is a depression amount of an accelerator pedal 71 detected by an accelerator opening degree sensor 60, a signal indicative of the rotation speed Nmg (electric motor rotation speed Nmg) of the electric motor MG detected by an electric motor rotation speed sensor 62, a signal indicative of the rotation speed Ne (engine rotation speed Ne) of the engine 12 detected by an engine rotation speed sensor 64, a signal indicative of a rotation speed Nt (turbine rotation speed Nt) of the turbine impeller 16*t* of the torque converter 16 detected by a turbine rotation speed sensor 66, a signal indicative of the vehicle speed V detected by a vehicle speed sensor 68, a signal indicative of the throttle opening degree 0th of the engine 12 detected by a throttle opening degree sensor 70, a signal indicative of a rotational position of the engine output shaft (crankshaft) 26 detected by a crank angle sensor 72, a signal indicative of a charge remaining amount (state of charge) SOC of the electric storage device 57 acquired from the electric storage device 57, etc. The electric motor rotation speed Nmg detected by the electric motor rotation speed sensor 62 is an input rotation speed of the torque converter 16 and corresponds to a rotation speed (pump rotation speed) Np of the pump impeller 16*p* in the torque converter 16. The turbine rotation speed Nt detected by the turbine rotation speed sensor 66 is an output rotation speed of the torque converter 16 and corresponds to a rotation speed Natin, i.e., the transmission input rotation speed Natin, of the transmission input shaft 19 in the automatic transmission 18. A rotation speed Natout, i.e., the transmission output rotation speed Natout, of an output shaft 20 (hereinafter referred to as a transmission output shaft 20) of the automatic transmission 18 corresponds to the vehicle speed V. A positive direction for both an engine torque Te and the electric motor torque Tmg is set to be the direction same as the rotation direction during drive of the engine 12.

The electronic control device 58 supplies various output signals to the devices disposed on the hybrid vehicle 8.

Figure 4:
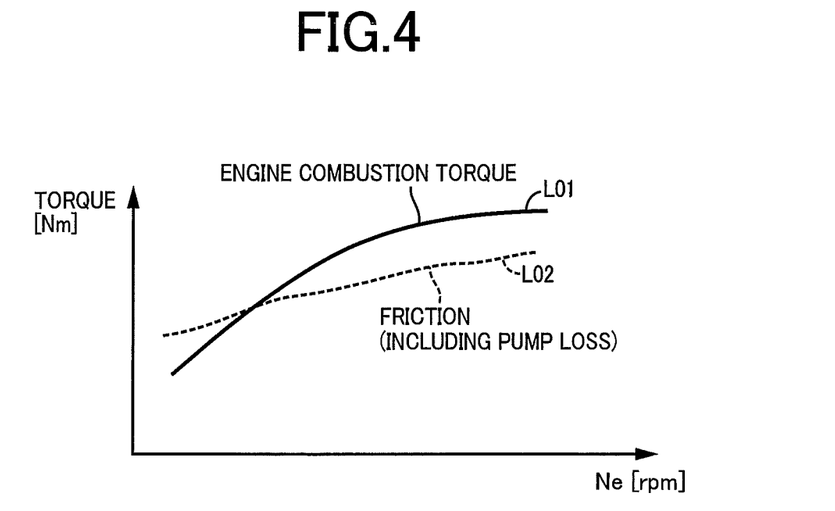
FIG. 4 is a diagram representing the relationship between a combustion torque generated by combustion of fuel used in a general engine and a friction of the engine based on an engine rotation speed in the form of a parameter.
Figure 5:
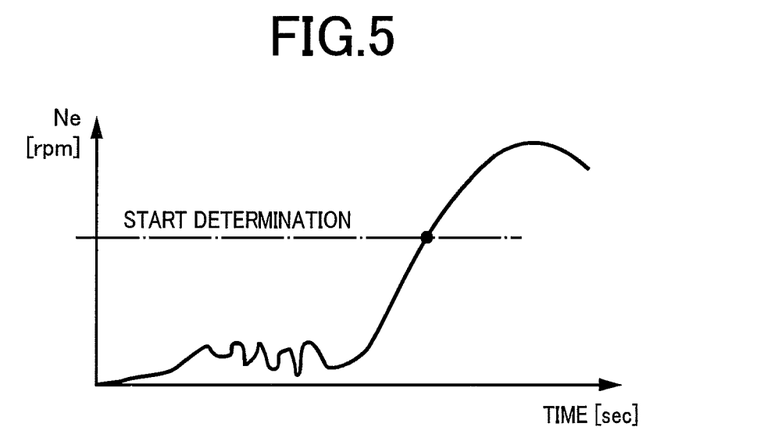
FIG. 5 is a time chart of an example when a start determination of the engine is made based on the engine rotation speed at the engine start.

When the engine 12 is started during the motor running, a start assist is provided to assist the engine cranking by the electric motor MG with the engine connecting/disconnecting clutch K0 slipped, regardless of whether the engine start is the ignition start. Unless this start assist is continued until a combustion torque (a solid line L01) generated by combustion of fuel in the engine 12 exceeds a friction (a broken line L02) including a rotational resistance of the engine 12 itself and a rotational resistance of a mechanical oil pump rotationally driven by the engine 12 as depicted in FIG. 4, the engine 12 cannot be started. Therefore, in general, a start determination is made to determine that the engine 12 becomes capable of the self-sustaining rotation when the engine rotation speed Ne reaches a predetermined rotation speed as depicted in FIG. 5. The timing of termination of the start assist is therefore determined based on the engine rotation speed Ne. The start determination is particularly necessary at the time of a cold start and, on the other hand, if the engine start is intermittently performed during the motor running after completion of warm-up of the engine 12, since an engine water temperature is already high and the rotational resistance of the engine 12 itself is substantially reduced, the timing of termination of the start assist may be determined by a timer, for example, and the start determination may not necessarily be made based on the engine rotation speed Ne. A shaft torque Te of the engine 12, i.e., the engine torque Te, is a torque output from the engine output shaft (crankshaft) 26 and is a torque acquired by subtracting the rotational resistance of the engine 12 itself from the combustion torque of the engine 12.

Figure 6:
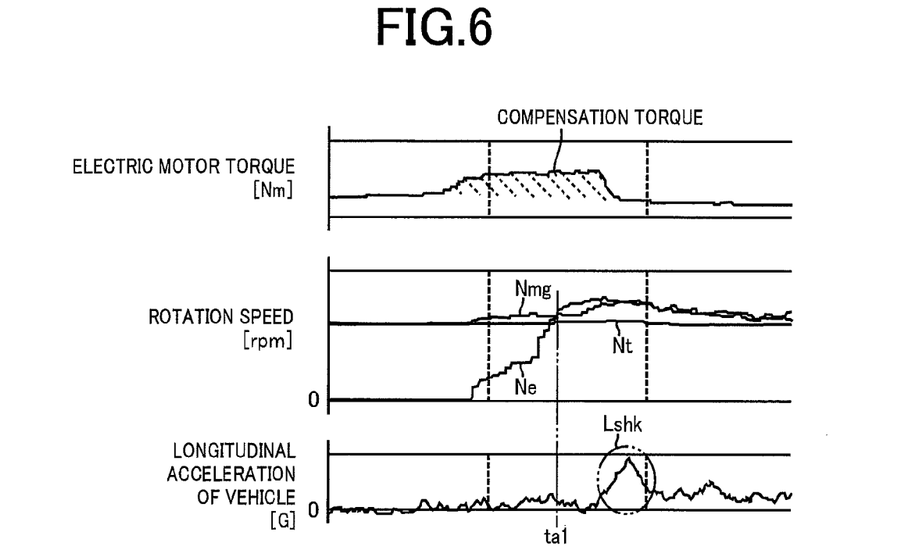
FIG. 6 is a time chart during the engine start for explaining how a start shock of the engine occurs.
Figure 7:
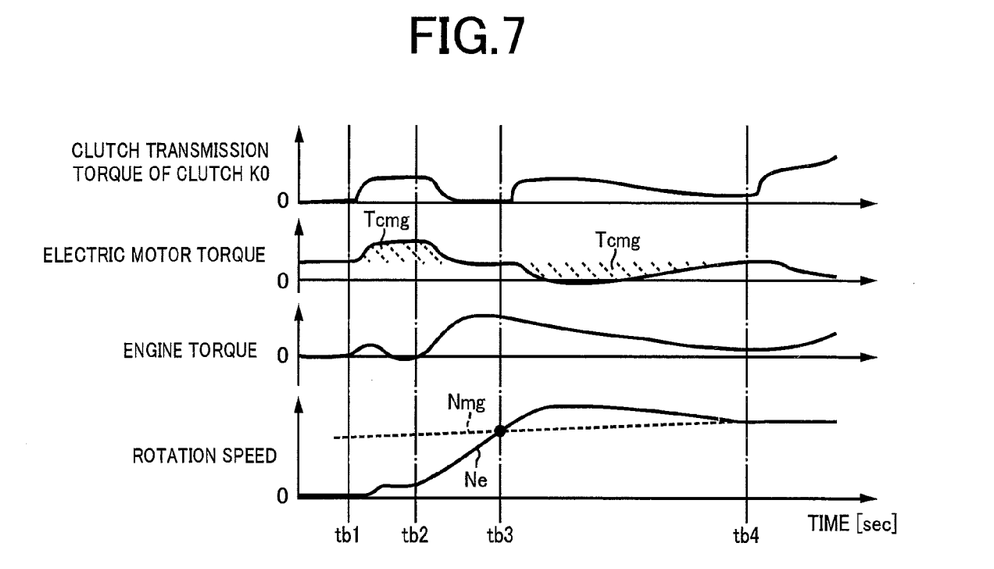
FIG. 7 is a time chart for explaining control provided by an electronic control device depicted in FIG. 1 starting the engine with an engine connecting/disconnecting clutch slipped during the motor running.

If the engine 12 is started with the engine connecting/disconnecting clutch K0 slipped during the motor running in the vehicle drive device 10 having the engine 12 that is the direct injection engine as in this example, the engine is started by the ignition start so as to rapidly start the engine 12 and, since the ignition start results in a large variation of the engine torque Te, the rising engine rotation speed Ne may once exceed the electric motor rotation speed Nmg during the slip of the engine connecting/disconnecting clutch K0 and then converge to the same rotation speed as the electric motor rotation speed Nmg. For example, a time chart of FIG. 6 depicts the engine rotation speed Ne once exceeding the electric motor rotation speed Nmg at time ta1 and thereby generating a start shock as indicated by a surrounded dashed-two dotted line Lshk. To take a measure for suppressing such a start shock, the electronic control device 58 of this example once releases the engine connecting/disconnecting clutch K0 during the slip when it is determined that the engine 12 is capable of the self-sustaining rotation after initiation of the engine start, and subsequently re-engages the engine connecting/disconnecting clutch K0 after the engine torque Te is sufficiently reduced. In other words, when it is determined that the engine 12 is capable of the self-sustaining rotation, the electronic control device 58 temporarily releases the engine connecting/disconnecting clutch K0 and subsequently completely engages the engine connecting/disconnecting clutch K0. FIG. 7 depicts a time chart for explaining this operation.

FIG. 7 is a time chart for explaining the control provided by the electronic control device 58 of this example starting the engine 12 with the engine connecting/disconnecting clutch K0 slipped during the motor running Specifically, the start of the engine 12 of FIG. 7 is performed in accordance with the engine start control of temporarily releasing the engine connecting/disconnecting clutch K0 after allowing the engine connecting/disconnecting clutch K0 to start slipping before the complete engagement. FIG. 7 depicts a clutch transmission torque Tk0 transmitted by the engine connecting/disconnecting clutch K0, the electric motor torque Tmg, the engine torque Te, and the rotation speeds Ne, Nmg from the top. The clutch transmission torque Tk0 is indicated as an absolute value in FIG. 7.

At time tb1 of FIG. 7, the electronic control device 58 starts the engine start control. Specifically, at the time tb1, the electronic control device 58 instructs the hydraulic control circuit 34 to slip the engine connecting/disconnecting clutch K0 for providing the start assist, thereby initiating the ignition start of the engine 12. After the time tb1 before time tb3, the electronic control device 58 causes the electric motor MG to generate an electric motor compensation torque Tcmg for canceling the torque (the clutch transmission torque Tk0) applied from the engine connecting/disconnecting clutch K0 to the drive wheels 24. The electric motor compensation torque Tcmg is added to a running torque to make up the output torque of the electric motor MG; i.e., the electric motor torque Tmg (=the running torque+the compensation torque).

At time tb2, the electronic control device 58 determines that the engine 12 becomes capable of the self-sustaining rotation, and instructs the hydraulic control circuit 34 to release the engine connecting/disconnecting clutch K0. At the time tb3, the engine rotation speed Ne rising from a stop state reaches the electric motor rotation speed Nmg. The electronic control device 58 instructs the hydraulic control circuit 34 to slip the engine connecting/disconnecting clutch K0 at the time tb3 so as to suppress the rise of the engine rotation speed Ne while causing the electric motor MG to generate the electric motor compensation torque Tcmg after the time tb3 before time tb4. Since the direction of the clutch transmission torque Tk0 is reversed from the time tb3 as can be seen from the magnitude relationship reversed from the time tb3 between the engine rotation speed Ne and the electric motor rotation speed Nmg, the electric motor compensation torque Tcmg in this case is a torque in the direction opposite to the electric motor compensation torque Tcmg before the time tb3. Lastly, at the time tb4, the engine rotation speed Ne converges and becomes identical to the electric motor rotation speed Nmg and, therefore, the electronic control device 58 accordingly instructs the hydraulic control circuit 34 to completely engage the engine connecting/disconnecting clutch K0.

The engine start control depicted in FIG. 7 is a very effective method for suppressing the start shock of the engine 12. However, unless the engine connecting/disconnecting clutch K0 is released and the clutch transmission torque Tk0 is sufficiently reduced before the time tb3 when the magnitude relationship is reversed between the engine rotation speed Ne and the electric motor rotation speed Nmg, the direction (positive/negative) of the electric motor compensation torque Tcmg becomes opposite to the direction of canceling the torque applied from the engine connecting/disconnecting clutch K0 to the drive wheels 24, which may increase the start shock. If it is determined at the time tb2 of FIG. 7 that the engine 12 becomes capable of the self-sustaining rotation based on, for example, the engine rotation speed Ne as depicted in FIG. 5, the start shock may increase due to a delay of the determination timing. The electronic control device 58 of this example therefore determines that the engine 12 becomes capable of the self-sustaining rotation in the engine start control, based on another detection amount, or specifically, a crank angle, rather than the engine rotation speed Ne. A main portion of the control function of the electronic control device 58 will hereinafter be described with reference to FIG. 8.

Figure 8:
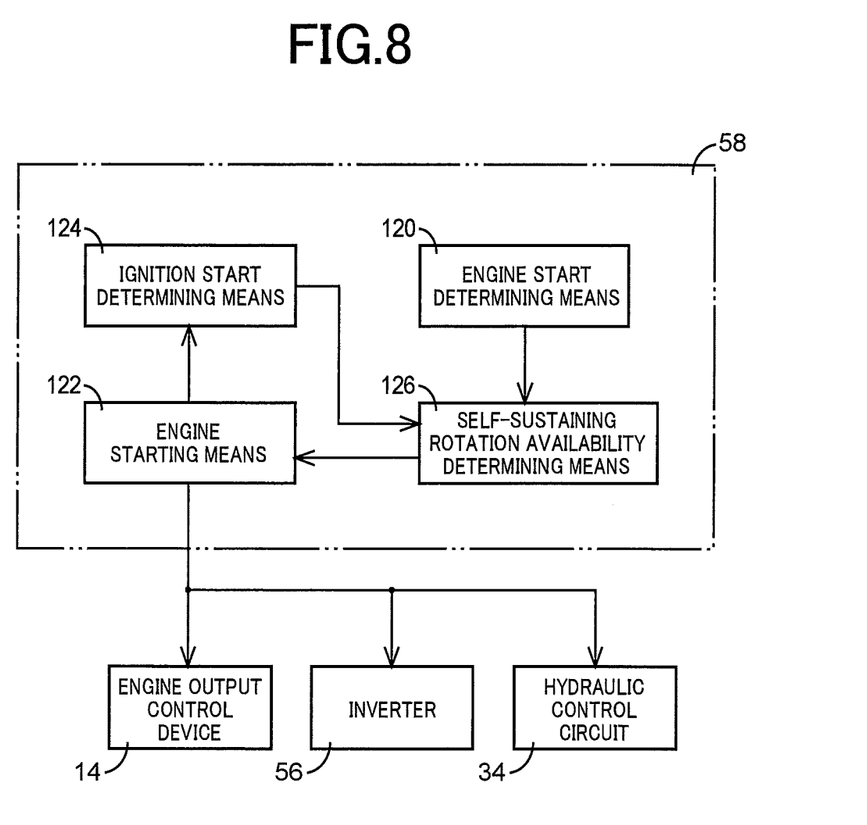
FIG. 8 is a functional block diagram for explaining a main portion of the control function included in the electronic control device depicted in FIG. 1.

FIG. 8 is a functional block diagram for explaining a main portion of the control function included in the electronic control device 58. As depicted in FIG. 8, the electronic control device 58 functionally includes an engine start determining means 120 as an engine start determining portion, an engine starting means 122 as an engine starting portion, an ignition start determining means 124 as an ignition start determining portion, and a self-sustaining rotation availability determining means 126 as a self-sustaining rotation availability determining portion.

The engine start determining means 120 determines whether an engine start request for starting the engine 12 is made and the engine start request is continuing during the motor running. In short, the engine start determining means 120 determines whether the engine is in a rising period after the initiation of the control of starting the engine 12 in the stop state until the engine 12 becomes capable of the self-sustaining rotation. For example, when determining that a required output cannot be satisfied by only the electric motor MG because of an increase in the accelerator opening degree Acc during the motor running, the electronic control device 58 makes the engine start request so as to start the engine 12 for switching the running mode from the motor running to the engine running. On the other hand, if the engine connecting/disconnecting clutch K0 put into the slip state by the engine starting means 122 is released, the electronic control device 58 cancels the engine start request because the engine 12 is capable of the self-sustaining rotation.

When the engine 12 is started during the motor running, or specifically, when the engine start request is made during the motor running, the engine starting means 122 slips the engine connecting/disconnecting clutch K0 to provide the start assist and starts the engine 12. In other words, the engine starting means 122 starts the engine 12 with the engine connecting/disconnecting clutch K0 slipped. For the engine start, the engine starting means 122 determines whether the ignition start is possible, based on the phase of the cylinder 80 in the expansion stroke in the stop state of the engine 12, and starts the engine 12 by the ignition start if possible. On the other hand, if it is determined that the ignition start is impossible, the engine starting means 122 performs a normal engine start by supplying and igniting fuel after the engine rotation speed Ne is increased to a certain level.

The ignition start determining means 124 determines whether the engine starting means 122 is performing the ignition start of the engine 12.

If the engine start determining means 120 determines that the engine is in the rising period and the ignition start determining means 124 determines that the ignition start of the engine 12 is being performed, the self-sustaining rotation availability determining means 126 determines whether the engine 12 starting rotation from the stop state becomes capable of the self-sustaining rotation, based on a start-up crank angle CAst rotated from the stop state of the engine 12. The start-up crank angle CAst is specifically a crank angle acquired by defining the stop state of the engine 12 before initiation of the engine start as zero (a starting point). For example, if the start-up crank angle CAst reaches a predefined crank angle determination value CA1, the self-sustaining rotation availability determining means 126 determines that the engine 12 becomes capable of the self-sustaining rotation. A method of setting the crank angle determination value CA1 will be described with reference to FIG. 9.

Figure 9:
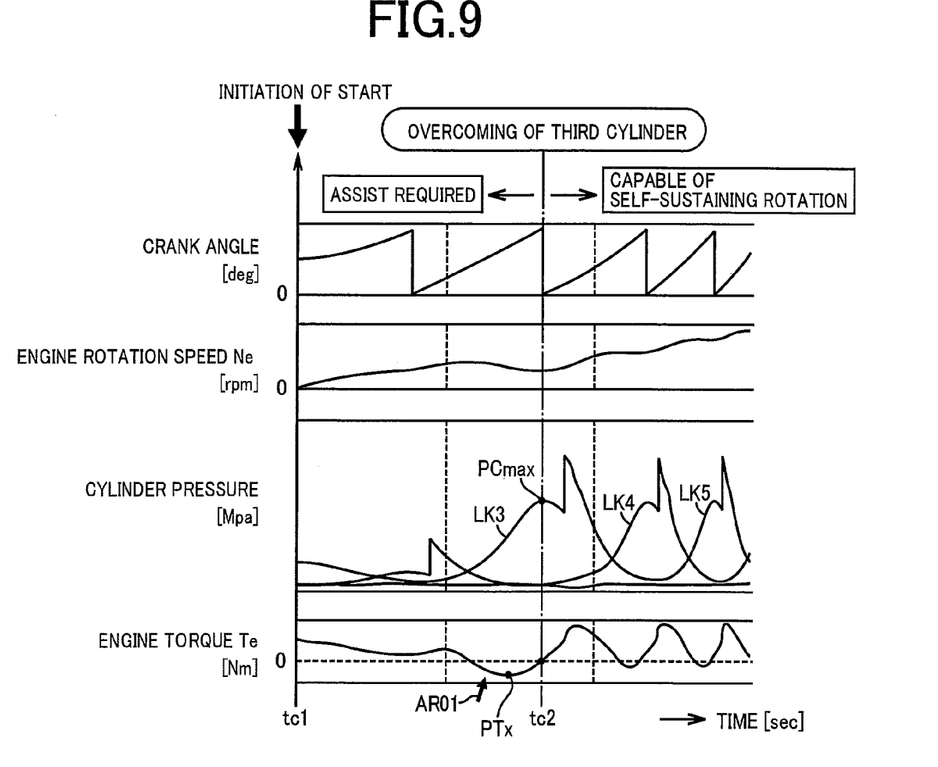
FIG. 9 is a time chart when the engine starts rotating from a starting point that is a time point of initiation of the start of the engine subjected to the ignition start in the hybrid vehicle depicted in FIG. 1.

FIG. 9 is a time chart when the engine 12 starts rotating from a starting point that is a time point of initiation of the start of the engine 12 subjected to the ignition start. A crank angle depicted in FIG. 9 is a crank angle when a predetermined rotational position of the engine output shaft 26 is defined as zero degrees and has a zero position different from that of the start-up crank angle CAst. Specifically, FIG. 9 depicts a time chart when the engine output shaft 26 starts rotating from the stop state of the engine 12 with the phases of the cylinders 80 as depicted in the cylinder phase diagram of FIG. 3. In short, at time tc1 that is the time point of initiation of the start of the engine 12, the phases of the cylinders 80 of the engine 12 are as depicted in FIG. 3. In a time chart of cylinder pressure that is the internal pressure of the cylinders 80, the cylinder pressure of the third cylinder K3 (see FIG. 3) is represented by a solid line LK3, and the cylinder pressure of the fourth cylinder K4 entering the compression stroke subsequently to the third cylinder K3 is represented by a solid line LK4, while the cylinder pressure of the fifth cylinder K5 entering the compression stroke subsequently to the fourth cylinder K4 is represented by a solid line LK5.

As depicted in FIG. 9, the engine rotation speed Ne gradually increases from the time tc1 over time. The engine torque Te is a positive torque for a while after the time tc1; however, when the third cylinder K3 of FIG. 3 enters the compression stroke, the engine torque Te starts decreasing due to a compression resistance in the third cylinder K3 and turns to a negative torque (see an arrow AR01). The engine torque Te goes through a first negative torque extreme value PTx after the time tc1, becomes zero at time tc2, and turns to a positive torque again from the time tc2. As can be seen from the cylinder pressure of the third cylinder K3 reaching a local maximum value PCmax at the time tc2, the time tc2 is the time point at which the compression stroke of the third cylinder K3 (third cylinder in terms of the order) is terminated and the third cylinder K3 enters the expansion stroke, i.e., the time point at which the piston position of the third cylinder K3 reaches the compression top dead center. Although the engine torque Te may momentarily be a negative torque after the time tc2, the engine torque Te is certainly a positive torque on the average. It is therefore considered that the engine 12 is capable of the self-sustaining rotation after the time tc2 and that the start assist is not necessary. Therefore, it can be determined from the time chart of the engine torque Te of FIG. 9 that the engine 12 becomes capable of the self-sustaining rotation when the engine torque Te goes through the first negative torque extreme value PTx after initiation of the start of the engine 12 and becomes zero from a negative torque if the ignition start of the engine 12 is performed. In other words, when the piston position reaches the compression top dead center in the third cylinder K3 in which the intake valve 88 is first switched from the opened state to the closed state among the multiple cylinders 80, it can be determined that the engine 12 becomes capable of the self-sustaining rotation.

For example, taking the case of starting the engine 12 from the stop state of the engine 12 with the phases of the cylinders 80 depicted in FIG. 3 as an example, the self-sustaining rotation availability determining means 126 calculates a crank angle AGK3 between the piston position of entering the third cylinder K3 in the stop state of the engine 12 and the compression top dead center depicted in FIG. 3, and sets the calculated crank angle AGK3 as the crank angle determination value CA1. The crank angle determination value CA1 is set immediately before the engine starting means 122 initiates the engine start, for example.

Returning to FIG. 8, after initiating the start assist, the engine starting means 122 continuously maintains the engine connecting/disconnecting clutch K0 in the slip state until the self-sustaining rotation availability determining means 126 determines that the engine 12 becomes capable of the self-sustaining rotation, i.e., until the start-up crank angle CAst reaches the crank angle determination value CA1. The start assist is also continued during the slip of the engine connecting/disconnecting clutch K0. On the other hand, if it is determined that the engine 12 becomes capable of the self-sustaining rotation, i.e., if the start-up crank angle CAst reaches the crank angle determination value CA1, the engine starting means 122 releases the engine connecting/disconnecting clutch K0. Specifically, the engine starting means 122 instructs the hydraulic control circuit 34 to release the engine connecting/disconnecting clutch K0 and terminates the start assist at the same time. As can be seen from the method of setting the crank angle determination value CA1 described above with reference to FIG. 9, the engine starting means 122 releasing the engine connecting/disconnecting clutch K0 in this way considers (i.e., determines) that the engine torque Te goes through the first negative torque extreme value PTx (see FIG. 9) after initiation of the start of the engine 12 and becomes zero from a negative torque if the start-up crank angle CAst reaches the crank angle determination value CA1 after initiation of the start of the engine 12. It can therefore be said that the engine starting means 122 releases the engine connecting/disconnecting clutch K0 in the slip state if the engine torque Te goes through the first negative torque extreme value PTx after initiation of the start of the engine 12 and becomes zero from a negative torque.

Figure 10:
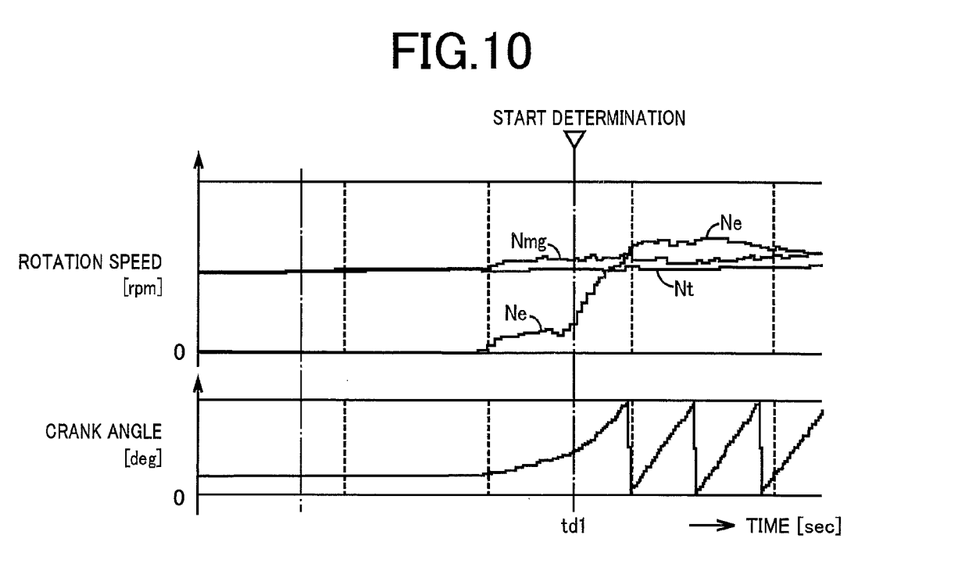
FIG. 10 is a time chart for explaining the timing when an engine starting means depicted in FIG. 8 gives an instruction for releasing the engine connecting/disconnecting clutch in an example of starting the engine depicted in FIG. 2 during the motor running in an actual test vehicle.

FIG. 10 is a time chart for explaining the timing when the engine starting means 122 gives an instruction for releasing the engine connecting/disconnecting clutch K0 in an example of starting the engine 12 during the motor running in an actual test vehicle. In FIG. 10, the self-sustaining rotation available determining means 126 determines that the start-up crank angle CAst reaches the crank angle determination value CA1 at time td1 when some time has elapsed after the time point of rising of the engine rotation speed Ne from zero due to the initiation of the engine start. At the time td1, the engine starting means 122 gives an instruction for releasing the engine connecting/disconnecting clutch K0. It is understood from FIG. 10 that the engine 12 is determined as being capable of the self-sustaining rotation by the self-sustaining rotation availability determining means 126 at the time td1, which is the time point substantially earlier than the time point when the engine rotation speed Ne exceeds the electric motor rotation speed Nmg, and that the instruction for releasing the engine connecting/disconnecting clutch K0 is given. It is also understood that, since the engine rotation speed Ne is substantially lower than the electric motor rotation speed Nmg at the time td1, the engine 12 is determined as being capable of the self-sustaining rotation by the self-sustaining rotation availability determining means 126 earlier than the case of determining whether the engine 12 becomes capable of the self-sustaining rotation based on the engine rotation speed Ne. The crank angle depicted in FIG. 10 is a crank angle when a predetermined rotational position of the engine output shaft 26 is defined as zero degrees and has a zero position different from that of the start-up crank angle CAst.

As described above, in the example of FIGS. 3 and 9, the crank angle determination value CA1 is set to a crank angle AGK3 from the piston position of the third cylinder K3 in the stop state of the engine 12 to the compression top dead center; however, the crank angle determination value CA1 may not always be set identical to the crank angle AGK3 and may be set to an angle somewhat increased or decreased from the crank angle AGK3. In an example of setting the crank angle determination value CA1 somewhat larger than the crank angle AGK3, the crank angle determination value CA1 may be set to a crank angle to a middle of the expansion stroke after the compression top dead center rather than the crank angle from the piston position to the compression top dead center. Specifically, it is conceivable that the crank angle determination value CA1 is set to a crank angle AGK3L acquired when the engine output shaft 26 starts rotating from the stop state of the engine 12 with the phases of the cylinders 80 depicted in FIG. 3 and the piston position of the third cylinder K3 reaches a predetermined piston position between the compression top dead center and an expansion stroke completion position. If the crank angle AGK3L is set as the crank angle determination value CA1, the engine starting means 122 releases the engine connecting/disconnecting clutch K0 in the slip state after initiation of the start of the engine 12 before the piston position reaches the expansion stroke completion position from the compression top dead center after the compression stroke in the cylinder (e.g., the third cylinder K3 of FIG. 3) in which the intake valve 88 is first switched from the opened state to the closed state among the multiple cylinders 80.

Although it is described that the engine 12 is capable of the self-sustaining rotation after the time tc2 in the description of FIG. 9, the engine 12 has a sufficiently large inertia in the rotation direction and, therefore, the engine 12 can certainly continuously rotate in a certain range even before the time tc2 until the engine torque Te turns to a positive torque due to the inertia of the engine 12 without the start assist. It is therefore conceivable that, after preliminarily empirically obtaining the start-up crank angle CAst leading to the generation of the inertia torque of the engine 12 required for the engine torque Te to go through the first negative torque extreme value PTx (see FIG. 9) and become zero from a negative torque, the preliminarily empirically obtained start-up crank angle CAst is set as the crank angle determination value CA1. The crank angle determination value CA1 in this case is the start-up crank angle CAst corresponding to a time point before the time tc2 in FIG. 9 and is therefore an angle smaller than the crank angle AGK3 (see FIG. 3). If the crank angle determination value CA1 is set in this way, the engine starting means 122 releases the engine connecting/disconnecting clutch K0 in the slip state after initiation of the start of the engine 12 when the inertia torque of the engine 12 is generated that is required for the engine torque Te to go through the first negative torque extreme value PTx and become zero from a negative torque.

Figure 11:
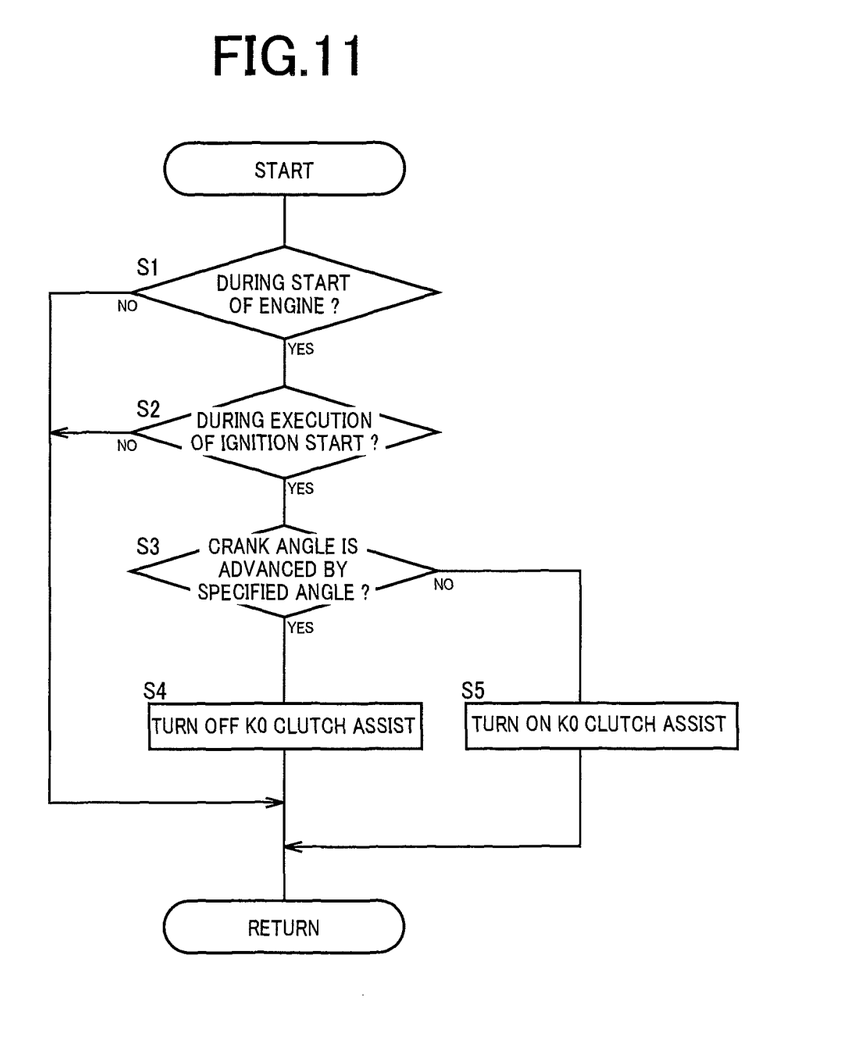
FIG. 11 is a flowchart for explaining a main portion of the control operation of the electronic control device depicted in FIG. 1, i.e., a control operation of releasing the engine connecting/disconnecting clutch once slipped when the ignition start of the engine is performed during the motor running.

FIG. 11 is a flowchart for explaining a main portion of the control operation of the electronic control device 58, i.e., a control operation of releasing the engine connecting/disconnecting clutch K0 once slipped when the ignition start of the engine 12 is performed during the motor running. For example, the control operation depicted in FIG. 11 is started during the motor running. The control operation depicted in FIG. 11 is performed solely or concurrently with another control operation.

First, at step (hereinafter, "step" will be omitted) S1 of FIG. 11, it is determined whether the engine is in the rising period after the initiation of the control of starting the engine 12 in the stop state until the engine 12 becomes capable of the self-sustaining rotation. If the determination of S1 is affirmative, i.e., if the engine 12 is in the rising period, the operation goes to S2. On the other hand, if the determination of S1 is negative, this flowchart is terminated. S1 corresponds to the engine start determining means 120.

At S2 corresponding to the ignition start determining means 124, it is determined whether the ignition start of the engine 12 is being performed. For example, if the stop state of the engine 12 before the engine start is a state in which the ignition start cannot be performed, the determination of S2 is negative. If the determination of S2 is affirmative, i.e., if the ignition start of the engine 12 is being performed, the operation goes to S3. On the other hand, if the determination of S2 is negative, this flowchart is terminated.

At S3 corresponding to the self-sustaining rotation availability determining means 126, it is determined whether the crank angle of the engine 12 is advanced by a specified angle (=the crank angle determination value CA1) or more from the stop state of the engine 12. Specifically, an angle of rotation of the engine output shaft 26 from the engine stop position, i.e., the start-up crank angle CAst, is measured. It is then determined whether the start-up crank angle CAst reaches the crank angle determination value CA1. If the determination of S3 is affirmative, i.e., if the start-up crank angle CAst reaches the crank angle determination value CA1, the operation goes to S4. On the other hand, if the determination of S3 is negative, the operation goes to S5. In the case of the time chart of FIG. 7, the determination of S3 is affirmative at the time tb2 of FIG. 7.

At S4, the hydraulic control circuit 34 is instructed to release the engine connecting/disconnecting clutch K0, and the start assist is terminated at the same time.

At S5, the slip state of the engine connecting/disconnecting clutch K0 is continued and the start assist is also continued. S4 and S5 correspond to the engine starting means 122.

According to this example described above, the engine 12 is a direct injection engine and, if the engine 12 is started during the motor running, the electronic control device 58 slips the engine connecting/disconnecting clutch K0 and starts the engine 12 by the ignition start. If the engine torque Te goes through the first negative torque extreme value PTx after initiation of the start of the engine 12 and becomes zero from a negative torque, the electronic control device 58 weakens the engagement force of the engine connecting/disconnecting clutch K0 as compared to before becoming zero. Specifically, the engine connecting/disconnecting clutch K0 is released. At the engine start, when the cylinder 80 in an intake stroke and closest to a compression stroke at the start of rotation of the engine 12 (e.g., the third cylinder K3 of FIG. 3) enters the compression stroke and the cylinder 80 is within the compression stroke, an engine stall is most likely to occur. In other words, when the cylinder 80 is within the compression stroke, a first largest compression torque (the first negative torque extreme value PTx) is generated. When the cylinder 80 passes through the compression stroke and enters the subsequent expansion stroke, the engine 12 generates a torque in the positive direction in the expansion stroke and, therefore, the next cylinder 80 entering the compression stroke subsequently to the cylinder 80 is facilitated to compress the intake air and easily increases the engine rotation speed Ne. Therefore, when the engine is started during the motor running, the electronic control device 58 can weaken the engagement force of the engine connecting/disconnecting clutch K0 at the timing earlier than the determination based on the engine rotation speed Ne while ensuring the certainty of the engine start, in accordance with the torque variation based on the mechanism of the engine 12. As a result, the torque capacity of the engine connecting/disconnecting clutch K0 can sufficiently be reduced before the time point (time tb3 of FIG. 7) at which the engine rotation speed Ne exceeds the electric motor rotation speed Nmg at the engine start and, therefore, the shock due to the engine start can be suppressed. Weakening the engagement force of the engine connecting/disconnecting clutch K0 is, in other words, to reduce the engagement force of the engine connecting/disconnecting clutch K0.

According to this example, if the inertia torque of the engine 12 is generated that is required for the engine torque Te to go through the first negative torque extreme value PTx and become zero from a negative torque after initiation of the start of the engine 12, the electronic control device 58 may weaken the engagement force of the engine connecting/disconnecting clutch K0 as compared to before the required inertia torque is generated, even though the engine torque Te is a negative torque. Specifically, the electronic control device 58 may release the engine connecting/disconnecting clutch K0. In this case, the electronic control device 58 can weaken the engagement force of the engine connecting/disconnecting clutch K0 at the earlier timing while ensuring the certainty of the engine start, as compared to the case of weakening the engagement force of the engine connecting/disconnecting clutch K0 when the engine torque Te goes through the first negative torque extreme value PTx after initiation of the start of the engine 12 and becomes zero from a negative torque. Therefore, the shock due to the engine start can more certainly be suppressed.

According to this example, if the crank angle rotated from the stop state of the engine 12 (=the start-up crank angle CAst) reaches the predefined crank angle determination value CA1 after initiation of the start of the engine 12, the electronic control device 58 considers that the engine torque Te goes through the first negative torque extreme value PTx after initiation of the start of the engine 12 and becomes zero from a negative torque. Therefore, the electronic control device 58 can easily determine the timing of weakening the engagement force of the engine connecting/disconnecting clutch K0, or specifically, the timing of releasing the engine connecting/disconnecting clutch K0 by detecting the start-up crank angle CAst.

According to this example, the electronic control device 58 may weaken the engagement force of the engine connecting/disconnecting clutch K0 after initiation of the start of the engine 12 before the piston position reaches the expansion stroke completion position from the compression top dead center in the cylinder 80 (e.g., the third cylinder K3 of FIG. 3) in which the intake valve 88 is first switched from the opened state to the closed state among the multiple cylinders 80 included in the engine 12 as compared to before the piston position reaches the compression top dead center. Specifically, the electronic control device 58 may release the engine connecting/disconnecting clutch K0. In this case, the electronic control device 58 can start weakening the engagement force of the engine connecting/disconnecting clutch K0 after the cylinder 80 having the intake valve 88 first switched from the opened state to the closed state certainly enters the expansion stroke and therefore can secure the more certain engine start.

Although the example of the present invention has been described in detail with reference to the drawings, this is merely an embodiment and the present invention can be implemented in variously modified and improved forms based on the knowledge of those skilled in the art.

For example, although the automatic transmission 18 is a stepped transmission in the example, the automatic transmission 18 may be a continuously variable transmission (CVT) capable of continuously varying a gear ratio. The automatic transmission 18 may not be included.

Although the engine 12 is a V-type engine in the example, the engine 12 may be an engine of another type, such as an in-line engine and a horizontally opposed engine. The engine 12 may not be limited to an eight-cylinder engine and may be a three-, four-, six-, or ten-cylinder engine, for example.

Although the fuel used in the engine 12 is gasoline in the example, the fuel may be ethanol or a blended fuel of ethanol and gasoline as well as hydrogen, LPG; etc.

Although the engine starting means 122 releases the engine connecting/disconnecting clutch K0 if the start-up crank angle CAst reaches the crank angle determination value CA1 after initiation of the start assist in the example, the engine starting means 122 may not completely release the engine connecting/disconnecting clutch K0 and, for example, may weaken the engagement force of the engine connecting/disconnecting clutch K0 as compared to before the start-up crank angle CAst reaches the crank angle determination value CA1 to maintain the engagement force of the engine connecting/disconnecting clutch K0 at a level such that the start shock is not increased.

Although the engine 12 and the electric motor MG are mutually disposed on the same axial center as depicted in FIG. 1 in the example, the electric motor MG may be disposed on an axial center different from that of the engine 12 and may operatively be coupled between the engine connecting/disconnecting clutch K0 and the torque converter 16 via a transmission or a chain.

Although the torque converter 16 includes the lock-up clutch LU in the example, the lock-up clutch LU may not be included. A vehicle drive device without the torque converter 16 may also be conceivable.

Although the torque converter 16 is used as a hydraulic power transmission device in the example, the torque converter 16 may be replaced with a fluid coupling such as a fluid coupling without a torque amplification effect, for example.

Although the engine starting means 122 temporarily releases the engine connecting/disconnecting clutch K0 (weakens the engagement force) after allowing the engine connecting/disconnecting clutch K0 to start slipping before the complete engagement if the engine 12 is started by the ignition start during the motor running, i.e., the running of the vehicle in the motor running mode in the example, the engine starting means 122 may temporarily release the engine connecting/disconnecting clutch K0 as described above if the engine 12 is started by the ignition start during the running of the vehicle 8 in the motor running mode without being limited to during the running of the vehicle or, in short, if the engine 12 is started by the ignition start during the motor running mode.

NOMENCLATURE OF ELEMENTS

10: vehicle drive device
12: engine (direct injection engine)
24: drive wheels
58: electronic control device (control device)
80: cylinder
88: intake valve
96: piston
MG: electric motor
K0: engine connecting/disconnecting clutch (clutch)

The invention claimed is:

1. A control device of a vehicle drive device including a direct injection engine, an electric motor, and a clutch selectively coupling the direct injection engine to a power transmission path from the electric motor to drive wheels,
   the control device slipping the clutch and starting the direct injection engine by an ignition start with fuel injected into a cylinder of the direct injection engine and ignited from a start of rotation of the direct injection engine if the direct injection engine is started during a running mode using only the electric motor as a drive source,
   the control device weakening an engagement force of the clutch if a shaft torque of the direct injection engine goes through a first negative torque extreme value after initiation of a start of the direct injection engine and becomes zero from a negative torque as compared to before becoming the zero, and
   the control device considering that the shaft torque of the direct injection engine goes through the first negative torque extreme value after the initiation of the start of the direct injection engine and becomes zero from the negative torque if a crank angle rotated from a stop state of the direct engine reaches a predefined crank angle determination value after the initiation of the start of the direct injection engine.

2. The control device of a vehicle drive device of claim 1, wherein
   if an inertia torque of the direct injection engine is generated that is required for the shaft torque of the direct injection engine to go through the first negative torque extreme value and become zero from the negative torque after the initiation of the start of the direct injection engine, the control device weakens the engagement force of the clutch as compared to before the required inertia torque is generated, even though the shaft torque of the direct injection engine is the negative torque.

3. A control device of a vehicle drive device including a direct injection engine, an electric motor, and a clutch selectively coupling the direct injection engine to a power transmission path from the electric motor to drive wheels,
   the control device slipping the clutch and starting the direct injection engine by an ignition start with fuel injected into a cylinder of the direct injection engine and ignited from a start of rotation of the direct injection engine if the direct injection engine is started during a running mode using only the electric motor as a drive source, the control device weakening an engagement force of the clutch before a piston position reaches an expansion stroke completion position from a compression top dead center after a compression stroke in a cylinder in which an intake valve is first switched from an opened state to a closed state after initiation of a start of the direct injection engine among multiple cylinders included in the direct injection engine as compared to before the piston position reaches the compression top dead center.

4. The control device of a vehicle drive device of claim 3, wherein the piston position is a position of a piston of the cylinder that is one of the multiple cylinders in which the intake valve is switched from the opened state to the closed state, earlier than an intake valve is switched from an opened state to a closed state in any of others of the multiple cylinders, after the initiation of the start of the direct injection engine, and the control device weakens the engagement force of the clutch before the piston position reaches the expansion stroke completion position, such that the engagement force of the clutch is smaller than an engagement force of the clutch at a stage before the piston position reaches the compression top dead center.

\* \* \* \* \*